Dec. 21, 1943.   L. O. CARLSEN   2,337,228
METHOD OF PRODUCING GEARS
Filed April 7, 1941   2 Sheets-Sheet 1

Inventor
LEONARD O. CARLSEN
By
Attorney

Dec. 21, 1943.  L. O. CARLSEN  2,337,228

METHOD OF PRODUCING GEARS

Filed April 7, 1941  2 Sheets-Sheet 2

Inventor
LEONARD O. CARLSEN
By
*B. E. Shlesinger*
Attorney

Patented Dec. 21, 1943

2,337,228

UNITED STATES PATENT OFFICE 2,337,228

METHOD OF PRODUCING GEARS

Leonard O. Carlsen, Rochester, N. Y., assignor to Gleason Works, Rochester, N. Y., a corporation of New York Application April 7, 1941, Serial No. 387,202

4 Claims. (Cl. 90—10)

The present invention relates to the cutting of gears and particularly to the rough-cutting of straight bevel gears. Specifically, the invention relates to a method and to apparatus for rough-cutting straight bevel gears with reciprocatory planing tools.

In the rough-cutting of straight bevel gears with reciprocatory planing tools, it is ordinarily the practice to use straight sided tools and to rough-cut the blank without generating roll. The straight sided tools have side-cutting edges equal to the pressure angle of the tooth surfaces to be cut, and, where no roll is employed, cutting is effected by reciprocating the tools across the face of the gear blank while feeding the tools depthwise into the blank until full depth position is reached. The tools cut in adjacent tooth spaces of the blank along paths that converge to the cone apex of the blank and which are disposed centrally of the finished tooth spaces. Of course, if a generating roll is employed, straight sided tools will produce generated tooth profiles of a shape approximating the desired finished tooth form, but when no generating roll is used, the tools will cut only straight sided tooth slots, and will leave a considerable amount of stock on the sides of the roughed tooth slots to be removed in the subsequent finishing operation. This puts a heavy burden on the finishing tools, and affects the life of the finishing tools and also the time of finish-cutting.

A primary object of the present invention is to provide a method and apparatus for rough-cutting straight bevel gears with reciprocating tools which will be faster than the methods heretofore employed and which will permit of rough-cutting such gears more nearly to finished tooth form.

A further object of the invention is to provide a practical form of reciprocatory planing tool for rough-cutting straight bevel gears to a shape approximating finished tooth form.

Other objects of the invention will be apparent hereinafter from the specification and from the recital of the appended claims.

Figure 3:
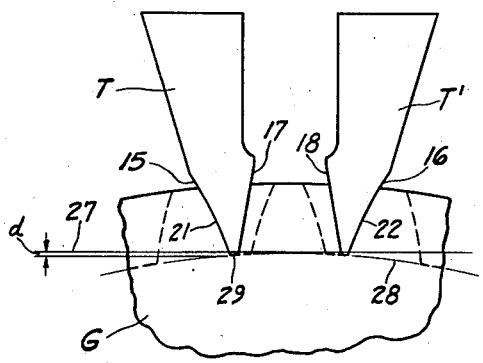
Fig. 3 is a fragmentary end view further illustrating diagrammatically how the tools operate in the rough-cutting of a gear according to the present invention.
Figure 4:
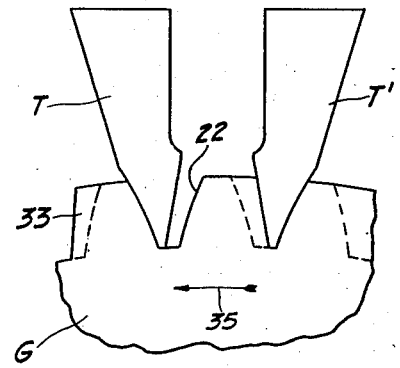
Figure 5:
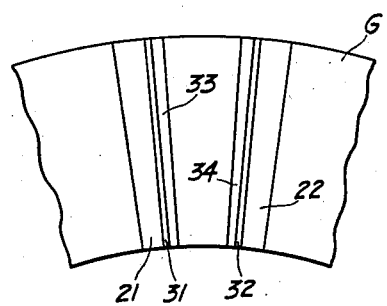
Figure 6:
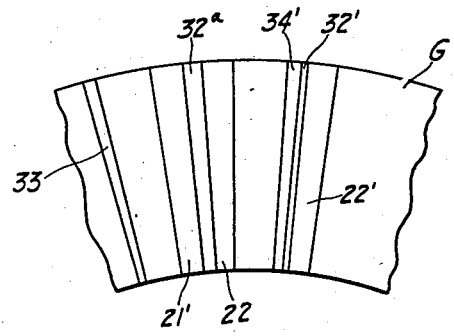

Fig. 4 is a view corresponding to Fig. 3, but illustrating the relative positions of tools and gear blank after the gear has been indexed through a tooth space; and Figs. 5 and 6 are fragmentary plan views of the gear blank showing, respectively, the results of the cuts taken by the tools in the position shown in Fig. 3 and the results of the cuts taken by the tools after the blank has been indexed from the position shown in Fig. 3 to that shown in Fig. 4.

In the process of the present invention, a pair of reciprocating planing tools are used whose outer side-cutting edges are of concave profile, preferably circular arcuate. The two tools are preferably positioned so that they cut in spaced, preferably adjacent, tooth spaces of a gear blank and cut on the more remotely spaced opposite sides of those two tooth spaces. The two tools are also preferably arranged so that they will cut along root cone elements of the said opposite sides of the tooth spaces. The blank itself is adjusted so that instead of its axis being inclined to the plane of cut of the tools at the root angle of the blank, its axis is inclined to this plane at slightly less than the root angle. Thus the tools may cut the tooth spaces to full depth.

Cutting is effected by reciprocating the tools in converging paths along the root cone elements of the blank while effecting a relative feed movement between the tools and blank until the tooth spaces have been cut to full depth. Then the tools are withdrawn and the blank is indexed. After the blank is indexed, one of the tools operates in the tooth space that has previously been operated upon by the other tool, and since the two tools cut along converging paths, the second tool will widen out the tooth slot, which has previously been cut by the first tool, and produce, in final form, a tooth space which tapers in width from end to end.

By making the outside cutting edges of the tools curved, cutting edges of positive pressure angle can be employed on all jobs and thus adequate tool clearance can be obtained without radial relief of the tool. As a result, the point width of the tools can be maintained throughout their life. Moreover, the outside cutting edges may be so curved that the tooth spaces of the blank can be roughed very close to finished shape. The inside cutting edges of the tools may be straight or curved, as desired. When they are made straight, the tools can be made somewhat cheaper. One tool recuts the tooth space that has previously been operated by the other tool, and when the roughing operation is completed, the opposite sides of the tooth slot are of curved profile, so that it does not make any difference in the final result whether the inside cutting edges of the tool are of straight profile or curved.

Referring now to the drawings, G designates the gear blank which is to be rough-cut to straight bevel gear form. The two planing tools which are employed in the rough-cutting operation are designated at T and T', respectively.

The invention may be practiced upon different conventional types of straight tooth bevel gear cutting machines.

Figure 1:
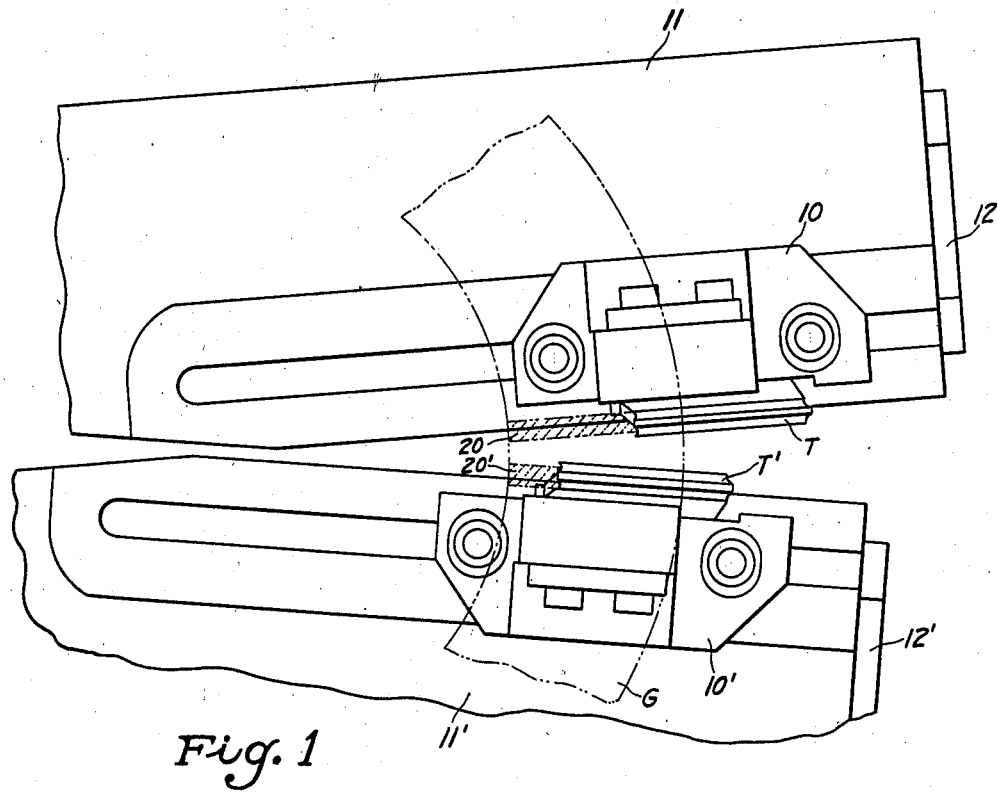
Fig. 1 is a fragmentary front elevation of the tool end of a conventional type of straight tooth bevel gear cutting machine, showing diagrammatically how the tool mechanism of the present invention may be employed on such a machine for rough-cutting a straight bevel gear.

In Fig. 1 of the drawings, there is illustrated fragmentarily and somewhat diagrammatically the tool end of straight bevel gear cutting machine of the general type disclosed in my earlier application No. 300,025, filed October 18, 1939. The two tools T and T' may be secured to the tool blocks 10 and 10', respectively, in the usual fashion by bolts which pass through openings 14 in the shank portions of the tools and which thread into the tool blocks. The tool blocks are adjustably mounted on slides 11 and 11', respectively. Slides 11 and 11' may be reciprocated by a crank or other suitable mechanism to move the tools simultaneously in opposite directions. These slides 11 and 11' are slidable upon the front heads of rams 12 and 12', respectively. The rams 12 and 12' are reciprocable in directions perpendicular to the plane of the drawing to move the tools to and from operative position so that each tool will cut on its stroke in one direction, and be withdrawn from cutting position on its return stroke.

The tools, in general, may be similar to the cutting tools commonly employed for cutting straight bevel gears. However, they are made with side-cutting edges at one or both sides which are of curved profile. Thus, as illustrated in Figs. 3 and 4, the outside cutting edge 15 of the tool T and the outside cutting edge 16 of the tool T' are of concave curved profile shape, being preferably circular arcs. The inside cutting edges 17 of the tool T and 18 of the tool T' may also be made of curved profile, but preferably they are made straight, as shown in the drawings, to keep the cost of the tools at a minimum.

For cutting the gear blank, the tools are positioned so that they will cut along paths inclined to one another and converging towards the cone apex of the gear blank, as illustrated diagrammatically in Fig. 1. Here the shaded parts 20 and 20' denote the portions of tooth slots of the gear G which are cut by the tools T and T'. The two tools T and T' are also spaced laterally from one another so that the outside cutting edge 15 of the tool T will cut one side 21 of a tooth slot of the gear blank and the outside cutting edge 16 of the other tool T' will cut in an adjacent tooth space of the gear blank but at the opposite side of that space most remote from the side 21 cut by the cutting edge 15 of the tool T. The shapes of the roughed tooth spaces to be cut in the gear blank G are shown in dotted lines in Figs. 3 and 4. Of course, the finished profiles will lie within the roughed profiles.

Figure 2:
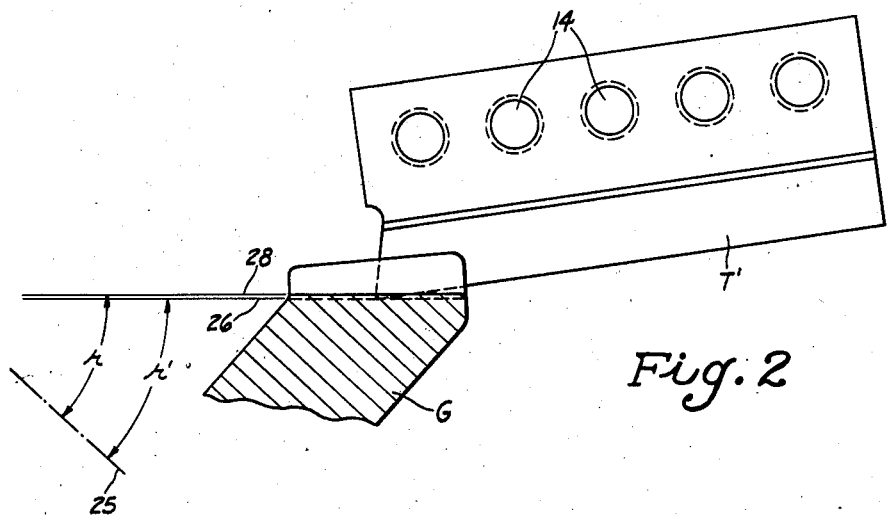
Fig. 2 is a view of a straight bevel gear in section and illustrating somewhat diagrammatically how the planing tools may be positioned with reference to the gear blank in the rough-cutting of the blank according to the present invention.

In order to cut the proper depth of tooth slot in all of the tooth spaces of the blank, the blank is adjusted angularly relative to the two tools, as shown in Fig. 2, so that its axis 25 is inclined to the plane 26 of cut of the two tools, that is, to the plane in which the tips of the two tools travel, at an angle $r'$ which is less than the root cone angle $r$ of the gear blank. Thus, as shown in Fig. 3, at full cutting depth, the tips of the two tools will cut a distance $d$ below a plane 27 tangent to the root surface 28 of the gear at a point intermediate the two tools.

As in the conventional rough-cutting process, the two tools are reciprocated longitudinally of the gear blank and simultaneously fed into depth. Fig. 3 shows a position of the tools, where they have reached full depth position after their cuts in the first two tooth spaces of the blank. In the cutting of these first tooth spaces, the tool T will have cut with its side-cutting edges 15 and 17 and its tip-cutting edge 29, a tooth slot which has a side of curved profile 21, a land 31 and a straight-sided profile 33. The tool T' will have cut a tooth slot having a side 22 of curved profile, a land 32 and a side of straight profile 34. The sides 21 and 22 will converge toward the cone apex 30 of the blank.

After the tools have reached full depth position, they are withdrawn, and the blank is indexed. It is assumed that the blank is indexed in the direction denoted by the arrow 35 in Fig. 4. The tools are then fed into the blank again until full depth position is reached. In this operation, the tool T will cut in the tooth space in which the tool T' has previously operated, while the tool T' will cut in a new tooth space of the blank. Fig. 4 shows the positions of the tools when they have reached full depth. Since the tool T cuts along a line inclined to the line of cut of the tool T' and converging to the cone apex 30, the tool T widens out the tooth slot previously cut by the tool T', and will produce a side 21' on this tooth slot which is of curved profile and which is inclined at the proper angle to the side 22 in accordance with the desired taper of the tooth spaces of the gear.

Fig. 6 shows the form of the blank after the tools have reached the position shown in Fig. 4. One tooth space of the blank will now have been completely roughed. This tooth space is bounded by the side 22, which has been cut by the cutting edge 16, the side 21', which has been cut by the cutting edge 15, and the land 32a which has been cut by the tip cutting edges of the two tools. The tool T' meantime has cut in another slot, forming the side 22' of curved profile, a narrow land 32', and a straight side 34'.

It will be noted that the cutting edges 15 and 16 of the two tools have positive pressure angles even at the juncture of the side-cutting edges and the tips. Hence, the tools will have proper cutting clearance. If in any case greater pressure angles are desired, these may be obtained by arranging the tools to cut in tooth spaces spaced further apart than adjacent tooth spaces. The tip cutting edges of the tools may be straight, or, if desired, they may be curved to follow the root line and cut to full depth over the whole width of the roughed tooth slots.

With the method described, the tool T' will do more work than the tool T because the tool T' will cut always into a new tooth slot, whereas the tool T will simply widen out and taper-cut the slot previously operated on by the tool T'. Wear of the two tools may be equalized, however, by indexing the blank in opposite directions in the cutting of successive gears. In this way, the tools T' and T will alternate in bearing the brunt of cutting.

One advantage of making the tools with outside cutting edges of curved profile as described, is that after each tool has been sharpened back approximately half-way, the tools may be transferred, and the upper tool may be transferred to the lower slide, and vice versa. This will permit sharpening each tool from its opposite end to obtain a maximum of tool life.

By using outside cutting edges 15 and 16 of circular arcuate profile, tooth profiles of approximately involute form can be rough-cut on a gear. It will be understood, however, that any other suitable profile curvature may be employed. It will be understood also that while the invention is particularly advantageous in the cutting of straight bevel gears, it may be also used for cutting other forms of straight tooth gears, such as spur gears. In this case, of course, the tools will not reciprocate along converging paths, but along longitudinally parallel paths. It will be understood, too, that while the invention has been described for rough-cutting, it may also be used for finish-cutting where form-cut tooth shapes are practical. In general, it may be said that while the invention has been described in connection with a particular embodiment thereof, it will be understood that it is capable of further modification and use, and this application is intended to cover any variations, uses, or adaptations of the invention, following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of cutting a straight tooth tapered gear which comprises employing a pair of reciprocatory tools, both of which have outside cutting edges of curved profile, positioning said tools in engagement with a gear blank so that said outside cutting edges will cut on the more remotely spaced opposite sides of different tooth slots of the blank, and reciprocating said tools in longitudinally rectilinear, converging paths across the face of the blank, while effecting a relative depthwise feed movement between the tools and blank in a direction perpendicular to the plane of cut until the tools reach full depth, and holding the blank stationary on its axis during said feed movement, and then withdrawing the tools from engagement with the blank, and indexing the blank.

2. The method of cutting a straight tooth tapered gear which comprises employing a pair of reciprocatory tools, both of which have outside cutting edges of concavely curved profile, positioning said tools relative to the gear blank so that said outside cutting edges will cut on the more remotely spaced opposite sides of different tooth slots of the blank, positioning the blank so that its axis is inclined to the plane of cut of the tools at an angle less than the root angle of the blank, and reciprocating said tools in longitudinally rectilinear, converging paths across the face of the blank while effecting a relative depthwise feed movement between the tools and blank in a direction perpendicular to the plane of cut until the tools reach full depth, and holding the blank stationary on its axis during said feed movement, and then withdrawing tools from engagement with the blank, and indexing the blank.

3. The method of cutting a straight tooth tapered gear which comprises employing a pair of reciprocatory tools, both of which have outside cutting edges of concave curved profile shape but of positive pressure angles at their tips, positioning said tools so that said outside cutting edges will cut on the more remotely spaced opposite sides of different tooth slots of the gear blank, positioning the blank so that its axis is inclined to the plane of cut of the tools at an angle less than the root angle of the blank, and reciprocating the tools in longitudinally rectilinear, converging paths across the face of the blank in the direction of the root cone elements of said opposite side tooth surfaces of the blank, while effecting a relative depthwise feed movement between the tools and blank in a direction perpendicular to the plane of cut until the tools have reached full depth, and holding the blank stationary on its axis during said feed movement, then withdrawing the tools from the blank, and indexing the blank.

4. The method of cutting a straight tooth tapered gear which comprises employing a pair of reciprocatory tools, both of which have outside cutting edges which are concave circular arcs, positioning said tools so that said outside cutting edges will cut on the more remotely spaced opposite sides of different tooth slots of a gear blank, positioning the blank so that its axis is inclined to the plane of cut of the tools at an angle less than the root angle of the blank, and reciprocating said tools in longitudinally rectilinear, converging paths across the face of the blank, while effecting a relative depthwise feed movement between the tools and blank in a direction perpendicular to the plane of cut until the tools have reached full depth, and holding the blank stationary on its axis during said feed movement, and then withdrawing the tools from the blank and indexing the blank.

LEONARD O. CARLSEN.